Patented May 10, 1932

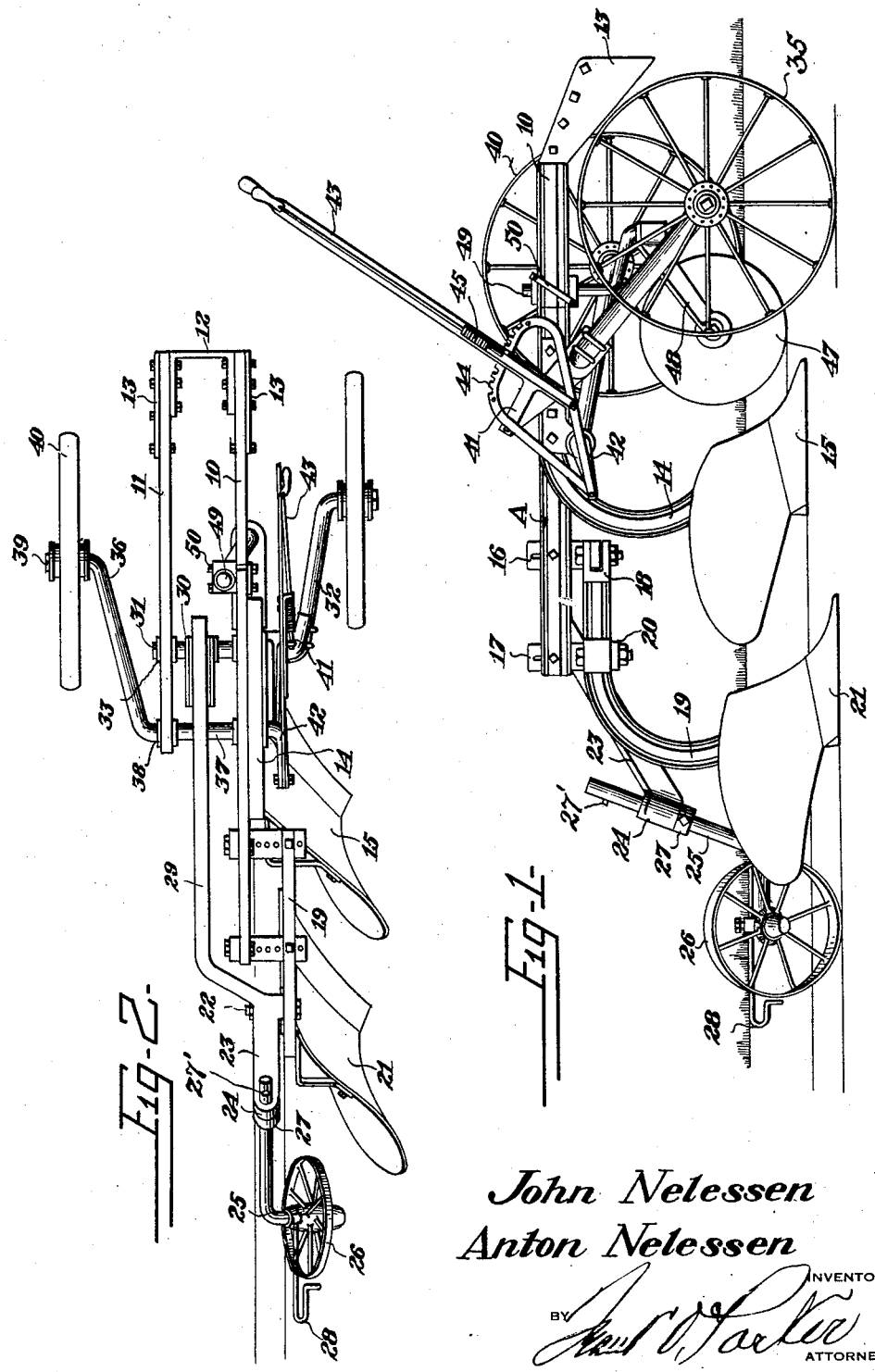

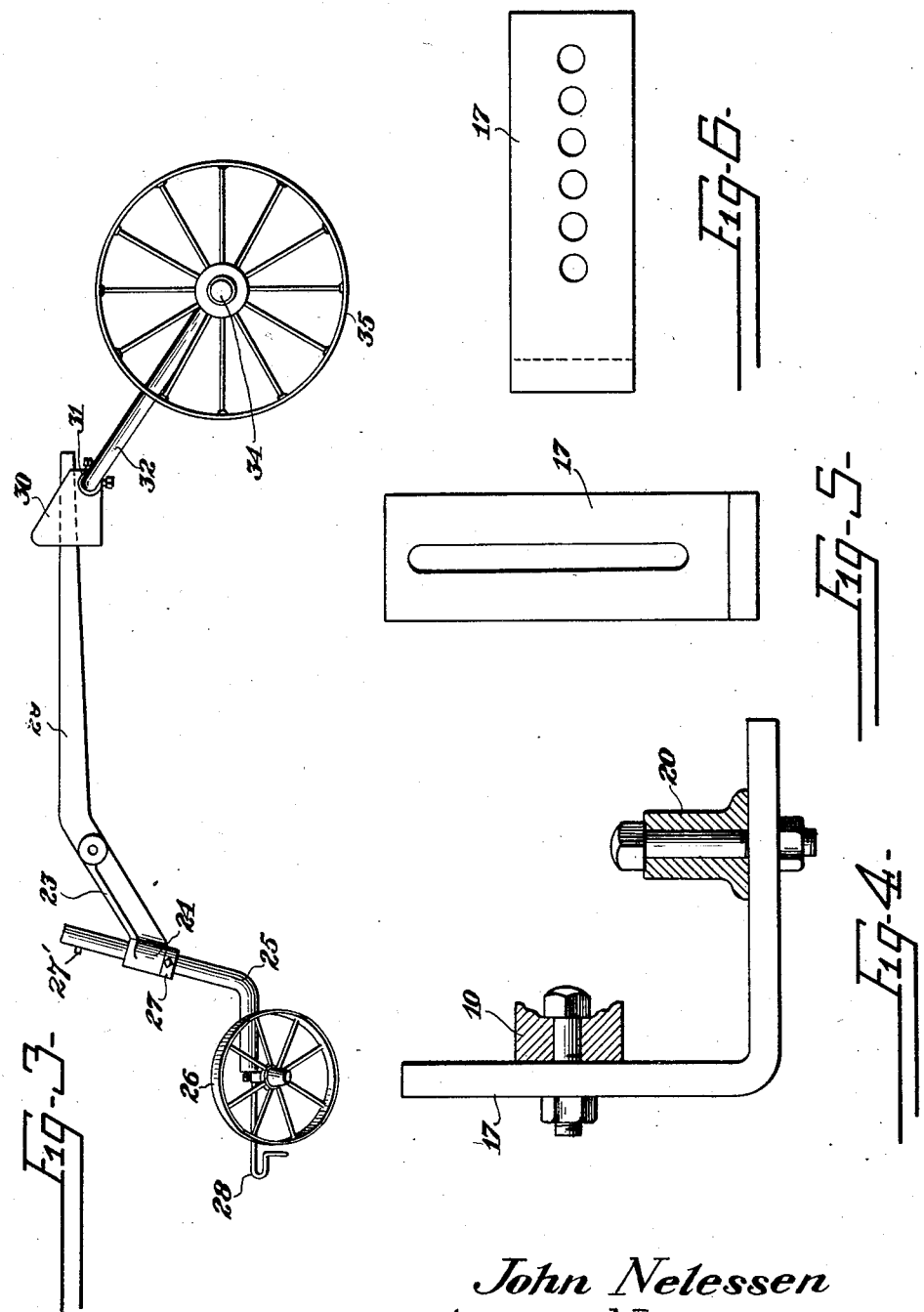

1,857,859

UNITED STATES PATENT OFFICE

JOHN NELESSEN AND ANTON NELESSEN, OF WRIGHTSTOWN, WISCONSIN

TANDEM SUBSOIL PLOW

Application filed April 28, 1931. Serial No. 533,546.

The invention relates to a plow construction and more especially to that class known as tandem subsoil plows.

The primary object of the invention is the provision of a plow of this character, wherein one plow share is arranged to follow another and this rearmost share being adapted to penetrate the earth deeper than the foremost share, which latter is adjustably mounted to regulate the pitch thereof which under such adjustment also defines the pitch of said rearmost plow, and the latter is caused to give a layer of the rich subsoil on top of the stubble soil as the plow is advanced through a field or over a ground surface.

Another object of this invention is the provision of a plow of this character, wherein the mounting of the shares is novel and adjustments had in a novel and effective manner.

A further object of the invention is the provision of a plow of this character, which is comparatively simple in construction, thoroughly reliable and efficient in its working, strong, durable, readily and easily adjusted, neat in appearance, positive in operation, and inexpensive to manufacture.

With these and other objects in view the invention consists in the features of construction, combination and arrangement of parts as will be hereinafter more fully described in detail, illustrated in the accompanying drawings which disclose the preferred embodiment of the invention, and pointed out in the claims hereunto appended.

In the accompanying drawings:

Figure 1 is an elevation of the tandem plow constructed in accordance with the invention.

Figure 2 is a top plan view thereof.

Figure 3 is a detail elevation of the wheel arrangement of the plow.

Figure 4 is a fragmentary vertical transverse section through portions of the frame of the plow showing in detail one of the hanger brackets for the rearmost plow share.

Figure 5 is an elevation of said bracket shown in Figure 4.

Figure 6 is a top plan view of the same.

Similar reference characters indicate corresponding parts throughout the several views in the drawings.

Referring to the drawings in detail, the tandem subsoil plow comprises a frame A which includes preferably long and short beams 10 and 11, respectively, these being arranged in spaced parallel relation to each other and are united at their forward ends by a cross-yoke 12, the latter being bolted or otherwise secured in place, while at the outside of said beams are coupling plates 13 for the attachment of a tractor or other draft means (not shown).

Detachably connected to the long beam 10 in any suitable manner is the forward plow standard 14 which is curved rearwardly, downwardly and forwardly and has attached to its lower end the foremost plow share 15, of any standard construction for subsoil purposes.

Mounted for vertical adjustment on the long beam 10 at or near its rear end are spaced substantially L-shaped brackets 16 and 17, and these project laterally outside of the frame A, while adjustably connected to the forward bracket 16 by a coupling 18 is the front end of a plow share standard 19, which is curved rearwardly, downwardly and forwardly, the same being also adjustably connected at 20 with the rearmost bracket 17, and has attached to its lower end a rear plow share 21 which is designed to penetrate the ground deeper than the forward share 15, as will be obvious from Figure 1, of the drawings.

The long beam 10 at its rear end has mounted therein a pivot 22 on which is supported a rocking hanger arm 23 which inclines rearwardly and terminates in a bearing 24 in which is adjustably fitted a substantially L-shaped standard 25 provided at its lower end with a suitable axle for a trailer wheel 26 of any standard type. The standard 25 is held in adjusted position in the bearing 24 by means of a set collar 27 engaged therein and also a retaining pin 27'. On the standard 25 is a dirt scraper 28 which follows the tread portion of the wheel 26 to remove dirt adhering thereto so as to keep this wheel clean during the working of the plow.

Hanger arm 23 is provided with a forwardly directed arm 29 which co-acts with a cam or eccentric 30 on the upper journal end 31 of the front hanger 32, the end 31 being supported for turning movement in suitable bearings 33 at the under edge of the long beam and short beam 10 and 11, and this hanger at its lower end forms a suitable axle 34 supporting a front traction wheel 35, which is located at one side of the frame A of the plow.

In rear of the end 31 of the hanger 32 is a similar hanger 36, the end 37 of which is journaled in suitable bearings 38 at the under edge of the long and short beams 10 and 11, while the lower end of this hanger 36 forms a suitable axle 39 supporting the other front traction wheel 40 at the other side of the frame A of the plow.

These hangers 32 and 36 are adjustable through connections 41 and 42 respectively with a throw lever 43 swingingly associated with a toothed segment 44 on the frame A, the lever 43 being provided with a hand released latching device 45 which coacts with the toothed rack 46 of the segment 44 and in this manner the hangers are held in adjusted positions. On operating the hanger 32 it should be apparent that the trailer wheel 26 will be regulated by the cam or eccentric 30 and thus the pitch and depth of penetration of the plows or shares will be controlled. Also it will be obvious that the shares 15 and 21 can be elevated when the plow has reached the end of a furrow or a field.

In advance of the foremost plow share 15 is a disk coulter 47 journaled in a fork 48 the standard 49 of which is adjustably mounted in a suitable bearing 50 carried on the long beam 10 of the frame A of the plow, the fork 48 being swiveled to the standard 49, yet it may be otherwise connected if found necessary.

The raising and lowering of the forward and rear plow shares 15 and 21 are controlled by the throw lever 43 and said shares may be lifted clear of the furrow or ground by actuating said lever as will be obvious.

The rear plow share 21 through its standard 19 can be laterally adjusted or angularly arranged as should be apparent.

What is claimed is:

1. A plow of the kind described, comprising a frame having longitudinal beams, a plow share depending from the frame forwardly thereof, a subsoil share rearwardly of the first named share, means for adjusting the subsoil share vertically and laterally of the frame, swinging axles supported by the frame in advance of the shares, means for adjusting the axles, front wheels on the axles, a trailer wheel rearwardly of the shares, and means for vertically swinging the trailer wheel and connected between the beams.

2. A plow of the kind described, comprising a frame having longitudinal beams, a plow share depending from the frame forwardly thereof, a subsoil share depending rearwardly of the first named share, means on the frame for adjusting the subsoil share vertically and laterally of the frame, swinging axles supported by the frame in advance of the shares, means for adjusting the axles, front wheels on the axles, a trailer-wheel rearwardly of the shares, means for vertically swinging the trailer wheel and connected between the beams, and cam means actuated by one of the axles to move the last named means.

3. A plow of the kind described, comprising a frame having longitudinal beams, a plow share depending from the frame forwardly thereof, a subsoil share depending rearwardly of the first named share, means on the frame for adjusting the subsoil share vertically and laterally of the frame, swinging axles supported by the frame in advance of the shares, means for adjusting the axles, front wheels on the axles, a trailer wheel rearwardly of the shares, means for vertically swinging the trailer wheel and connected between the beams, cam means actuated by one of the axles to move the last mentioned means, and means for holding the axle adjusting means.

In testimony whereof we affix our signatures.

JOHN NELESSEN.
ANTON NELESSEN.